United States Patent [19]

Kawamura et al.

[11] 4,028,712
[45] June 7, 1977

[54] DISPLAY SYSTEM FOR PHOTOGRAPHIC CAMERA

[75] Inventors: Masaharu Kawamura, Hino; Nobuaki Sakurada, Yokohama; Nobuhiko Shinoda, Tokyo; Tadashi Ito, Yokohama; Fumio Ito, Yokohama; Hiroyashu Murakami, Tokyo, all of Japan

[73] Assignee: Kanon Kabushiki Kaisha, Tokyo, Japan

[22] Filed: Nov. 26, 1975

[21] Appl. No.: 635,370

[30] Foreign Application Priority Data

Nov. 27, 1974   Japan .............................. 49-136843
Nov. 27, 1974   Japan .............................. 49-136844

[52] U.S. Cl. .......................... 354/23 D; 340/324 R; 354/53; 354/60 L; 356/226
[51] Int. Cl.² ........................................ G03B 17/20
[58] Field of Search ................. 354/23 D, 53, 60 L, 354/60 A; 356/226, 227; 340/324 R, 366 R

[56] References Cited

UNITED STATES PATENTS 3,755,806   8/1973   Bunting .......................... 340/324 R
3,909,137   9/1975   Kisanuki .......................... 354/23 D
3,971,048   7/1976   Ito et al. .......................... 354/23 D

FOREIGN PATENTS OR APPLICATIONS 2,434,152   2/1975   Germany .......................... 354/23 D

*Primary Examiner*—Russell E. Adams
*Attorney, Agent, or Firm*—Toren, McGeady and Stanger

[57] ABSTRACT

A display system for a camera of the type having shutter preselection and diaphragm preselection automatic exposure control modes which are selectively operative by a switch is provided with a single array of decimal digit display elements for displaying the numerical values of the preselected shutter speed or diaphragm aperture and of the computed result representing the effective aperture or exposure time respectively at a time in combination with control means cooperative with the mode select switch for controlling relative display arrangement of the numerical values and/or display color change, thereby it being made possible for the photographer looking the display to insure that the camera operates in the intentionally selected exposure control mode.

3 Claims, 6 Drawing Figures

DISPLAY SYSTEM FOR PHOTOGRAPHIC CAMERA

BACKGROUND OF THE INVENTION

1. Field of the Invention

This invention relates to display systems for cameras of the type provided with a shutter preselection automatic exposure control mode and with a diaphragm preselection automatic exposure control mode, and more particularly to a display system which can be selectively operated in cooperation with the mode select switch to show which mode is rendered operative.

2. Description of the Prior Art

The recently developed cameras having automatic exposure control apparatus generally involve the intentional selection of at least two operating ranges, i.e., a shutter preselection automatic exposure range in which an effective exposure aperture is derived in response to preselection of a desired shutter speed, and a diaphragm preselection automatic exposure range in which an effective exposure time is derived in response to preselection of a desired diaphragm aperture value. With such type camera, it is desirable to provide means for indicating to the photographer whether or not the camera is set in the intentionally selected mode, or for accomplishing substantially error-free manipulation of the camera. According to the prior art, such indicating means have been constructed in the separate form such as of lamps from the display device for displaying the numerical values of the preselected exposure control parameter and the computed result. This complexity makes the display system relatively bulky and also increases production cost. Further, the separate location of the display device and the indicating means will not permit for the photographer to assure a perfect recognition of the camera setting, giving an additional disadvantage of increasing the possibility of introduction of error to the exposure control system.

The present invention has for the general object to eliminate the above mentioned conventional drawbacks and to provide a display system for a camera of the type described which can be selectively operated to show which mode is rendered operative without the necessity of using any indicating means independent of the display tubes.

According to one embodiment of the invention, this object is accomplished by controlling the display position of the preselected exposure control parameter relative to that of the computed result.

According to another embodiment of the invention, this object is accomplished by controlling display color change for the preselected exposure control parameter.

According to another object of the invention, this object is accomplished by combining the methods employed in the first and second embodiments of the invention with each other.

Other objects, features and advantages of the invention will become apparent from the following detailed description taken in conjunction with the accompanying drawings in which:

DESCRIPTION OF THE PREFERRED EMBODIMENTS

Figure 1:
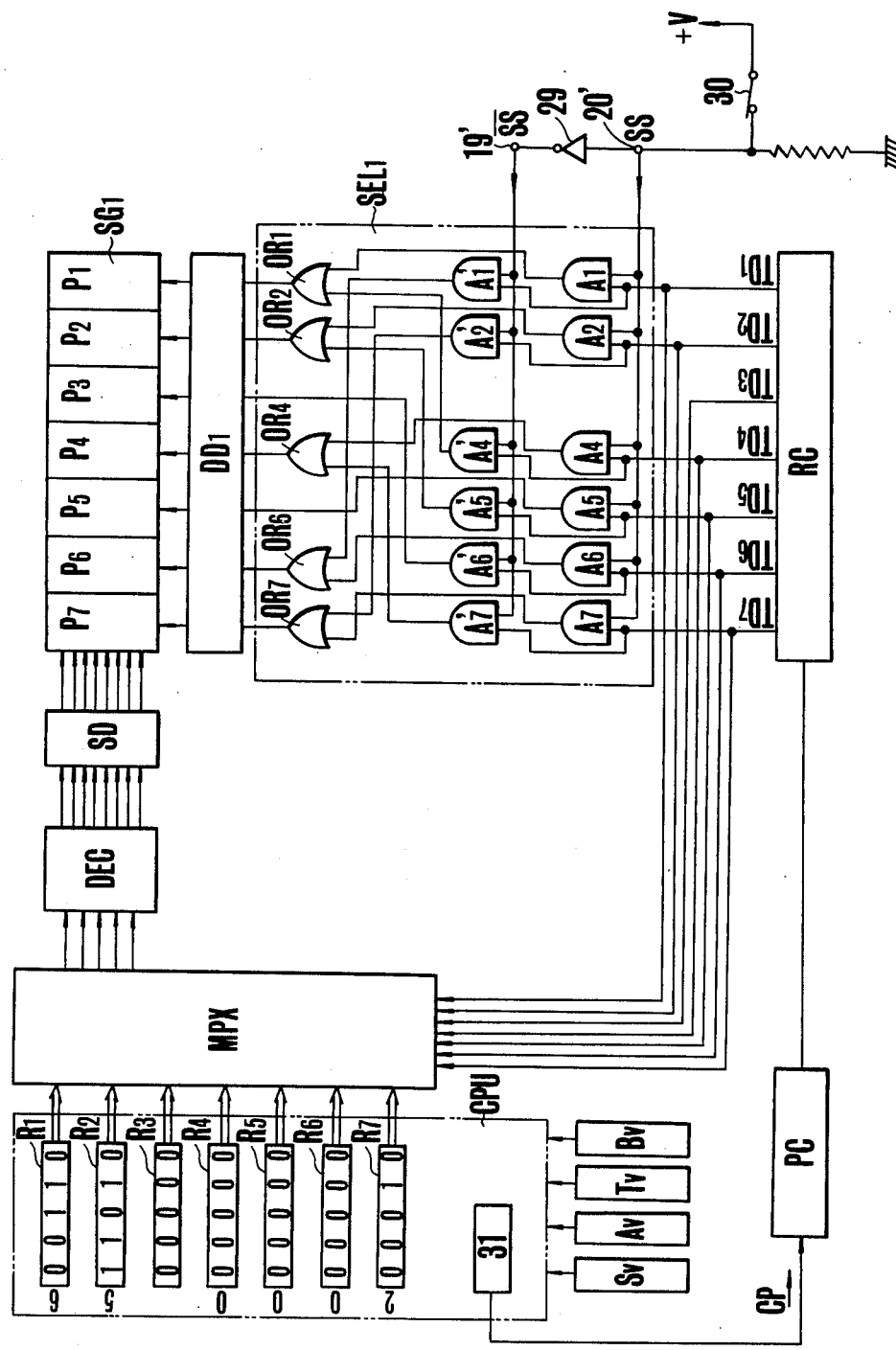
FIG. 1 is a block diagram of a display system according to one embodiment of the invention shown as associated with a digitally operated automatic exposure control system in a camera of the type described.
Figure 2:
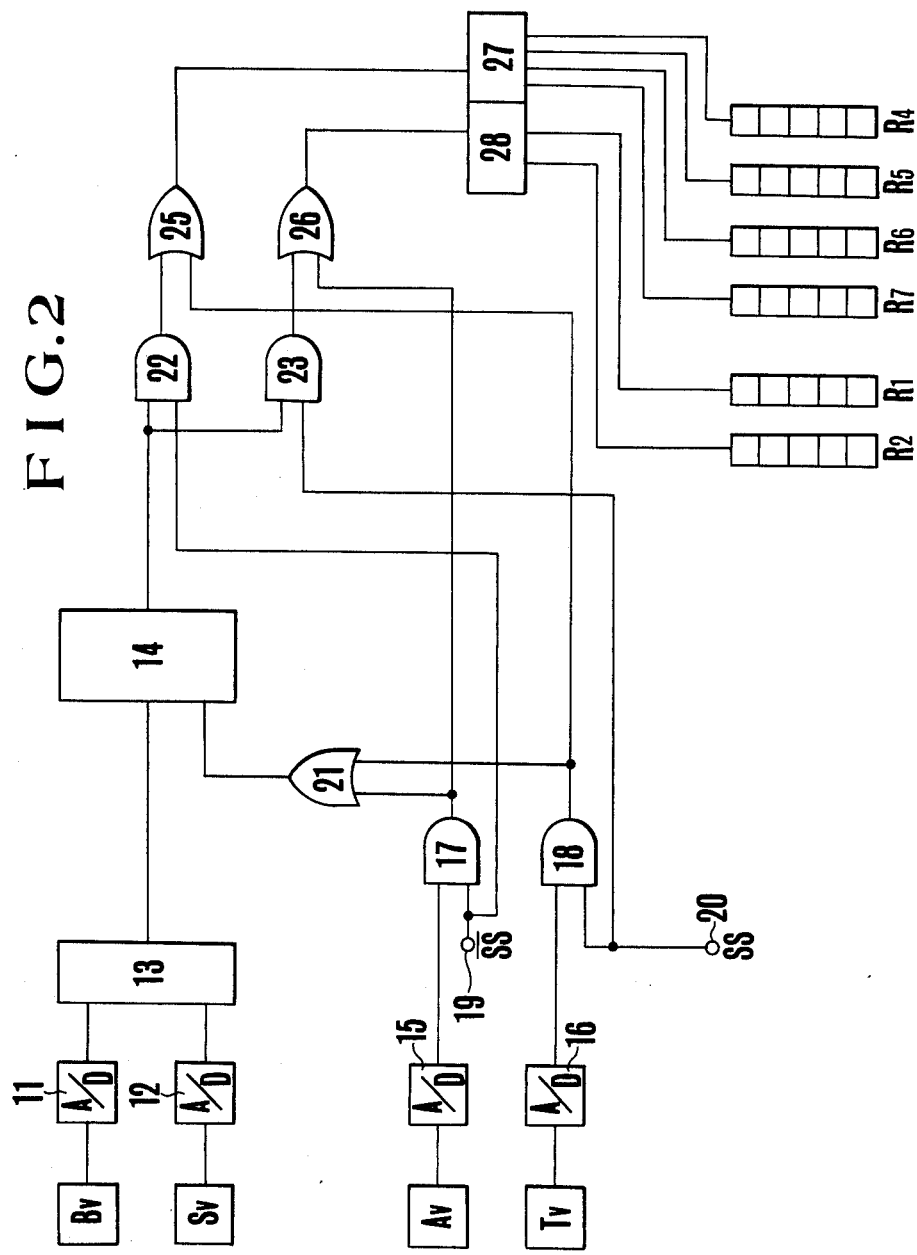
FIG. 2 is a block diagram of an automatic exposure control circuit comprising a computer, registers and their associated control circuitry usable in the block CPU of FIG. 1.

Referring to FIGS. 1 and 2, there is shown one embodiment of a display system according to the present invention as adapted for use in conjunction with a digitally operated automatic exposure control circuit incorporated in a camera of the type described. As noted above, the first embodiment consists in displaying the preselected exposure control parameter value in the decimal digit form at a constant location relative to that of the computed result, in this instance, the rightmost digit display position of the parameter value is located just or one place to the left of the most significant digit of the result.

A block CPU of FIG. 1 indicates the digitally operated automatic exposure control circuit provided with a plurality of exposure control parameter setting means such as a film speed setter $Sv$, a diaphragm aperture setter $Av$, a shutter speed setter $Tv$ and a light value meter $Bv$. These setters $Sv$, $Av$ and $Tv$ may be of the conventional types, e.g., ASA dial, diaphragm ring and shutter dial respectively. In order to store the preselected shutter speed or diaphragm aperture value and the computed result in binary code, there is provided first and second groups of 5-bit registers $R_1$ through $R_7$, the total number of the registers depending upon the number of digit display positions necessary to display the parameter and result at a time. The correspondence between the binary coded signals and decimal digit characters is shown in the following table 1.

Table 1

| Binary Code | Digit | Binary Code | Digit with Decimal Point |
|---|---|---|---|
| 0 0 0 0 0 | 0 | 1 0 0 0 0 | 0. |
| 0 0 0 0 1 | 1 | 1 0 0 0 1 | 1. |
| 0 0 0 1 0 | 2 | 1 0 0 1 0 | 2. |
| 0 0 0 1 1 | 3 | 1 0 0 1 1 | 3. |
| 0 0 1 0 0 | 4 | 1 0 1 0 0 | 4. |
| 0 0 1 0 1 | 5 | 1 0 1 0 1 | 5. |
| 0 0 1 1 0 | 6 | 1 0 1 1 0 | 6. |
| 0 0 1 1 1 | 7 | 1 0 1 1 1 | 7. |
| 0 1 0 0 0 | 8 | 1 1 0 0 0 | 8. |
| 0 1 0 0 1 | 9 | 1 1 0 0 1 | 9. |

The details of the control circuit CPU are shown in FIG. 2. The analogue output signals from light meter $Bv$ and film speed setter $Sv$ after converted to digital signals by respective analogue-to-digital converters 11 and 12 are combined with each other by an adder 13, and the output of adder 13 is applied to a first input of a computer 14. Applied to a second input of computer 14 is one of the output signals of the diaphragm aperture setter $Av$ and shutter speed setter $Tv$ after they are converted from to digital signals by respective analogue-to-digital converters 15 and 16. In order to select either of the outputs of converters 15 and 16 for connection with the second input of computer 14, there are provided two AND gates 17 and 18 connected to converters 15 and 16 respectively and a common OR gate 21 having two inputs connected to outputs of AND gates 17 and 18 and having an output connected to the second input of computer 14. The gating control inputs 19 and 20 of AND gates 17 and 18 are connected to a mode select switch 30 (FIG. 1) so that when the camera is set to the shutter preselection or diaphragm preselection automatic exposure control mode, AND gate 18 or 17 is gated on by application of a control signal SS or $\overline{SS}$ respectively. The output of computer 14 is directed through an AND gate 22 or 23 and an OR gate 25 or 26 to a first or second distributor 27 or 28 when the computed result is representative of an effective exposure time or exposure aperture respectively, while the preselected aperture value or shutter speed is applied to the second and first distributor 28 or 27 through the OR gate 26 or 25 respectively. To effect this selective application of the digital signals representative of the preselected factor and computed result, the gating control inputs of AND gates 22 and 23 are connected with those of AND gates 17 and 18 respectively. The first and second distributors 27 and 28 are connected to the first and second groups of registers $R_1$ through $R_7$.

Referring again to FIG. 1, the display system is shown as comprising a timing pulse generator PC connected to a clock pulse generator 31 of the exposure control circuit CPU and responsive to every five clock pulses supplied therefrom for producing one digit timing pulse and, a ring counter RC connected the timing pulse generator PC for producing seven strobe pulse trains from its respective stages $TD_1$ through $TD_7$, the pulses from the successive stages being time-displaced from each other by one repitition period of the digit timing pulses. The strobe pulse trains are applied to a multiplexer MPX to effect the sequence of presentation of data from the registers $R_1$ through $R_7$ to a display device $SG_1$ comprised of a number of seven-segment type light-emitting diodes $P_1$ through $P_7$ through a segment driver SD and decoder DEC. With this arrangement, the data in the registers $R_1$ through $R_7$ are available serially from the least significant digit of the diaphragm aperture value to the most significant digit of the shutter time value in binary coded decimal form.

In order that the display device $SG_1$ can be selectively operated, or that the rightmost digit display position of the preselected exposure control parameter value is located just or one pulse to the left of the most significant digit of the computed result regardless of which mode is rendered operative, there is provided a select switching network $SEL_1$ which comprises a first array of AND gates $A_1$, $A_2$ and $A_4$ through $A_7$ with their pulse inputs connected to the respective stages $TD_1$ through $TD_7$ of ring counter RC and with their gating control inputs connected to a common terminal 20' corresponding to that 20 of FIG. 2, and a second array of AND gates $A_1'$, $A_2'$ and $A_4'$ through $A_7'$ with their pulse inputs connected to the respective stages $TD_1$ through $TD_7$ of ring counter RC and with their gating control inputs connected to a common terminal 19' corresponding to that 19 of FIG. 2, the two terminals 19' and 20' being connected each other through an inverter 29, and the terminal 20' being connected through the mode select switch 30 to a potential (+V) so that when the mode select switch 30 is closed to switch the camera to the shutter preselection automatic exposure control mode, the control signal SS is applied to the terminal 20', while when the mode select switch 30 is opened, the control signal $\overline{SS}$ is applied to the terminal 19'. The outputs of AND gate $A_1$ and $A_4'$ are connected through a common OR gate $OR_1$ and digit driver $DD_1$ to the first or mostright display element $P_1$, the outputs of AND gates $A_2$ and $A_5'$ are connected through a common OR gate $OR_2$ and digit driver $DD_1$ to the second display element $P_2$, the outputs of AND gates $A_4$ and $A_7'$ are connected through a common OR gate $OR_4$ and digit driver $DD_1$ to the fourth display element $P_4$, the output of AND gate $A_5$ is connected through digit driver $DD_1$ to the fifth display element $P_5$ without passing through any OR gate, the outputs of AND gates $A_6$ and $A_1'$ are connected through a common OR gate $OR_6$ and digit driver $DD_1$ to the sixth display element $P_6$, the outputs of AND gates $A_7$ and $A_2'$ are connected through a common OR gate $OR_7$ and digit driver $DD_1$ to the seventh display element $P_7$, and the output of AND gate $A_6'$ is connected through digit driver $DD_1$ to the third display element $P_3$ without passing through any OR gate.

The operation of the display system of FIG. 1 will next be described in connection with the operation of the exposure control system of FIG. 2 with reference to the pulse timing chart of FIG. 3. In the case of the shutter preselection automatic exposure control mode, the sensitivity of the used film is set in by the setter Sv, and a desired shutter speed, for example, 1/2000 second, is set in by the setter Tv. Next the camera is set to the light value metering position and the mode select switch 30 is closed, thereby the information from the film speed setter Sv and light meter Bv is converted from analogue to digital form by converters 11 and 12, and the digital outputs of converters 11 and 12 are combined with each other by adder 13 to produce a digital output which is then applied to computer 14. On the other hand, because of the closure of mode select switch 30, the shutter preference signal SS is applied to AND gates 18 and 23. As the AND gate 18 is gated on, the output of shutter speed setter Tv after converted from analogue to digital form by converter 16 is applied to both of computer 14 and distributor 27 through OR gate 21 and through OR gate 25 respectively. The preselected shutter speed value or 1/2000 second is taken into account as a word of successive four digit characters, namely 2000 and is distributed to the registers $R_4$ through $R_7$. Each digit character is coded in the five-bit binary form and stored in the respective register.

Responsive to the digital signals supplied from adder 13 and shutter speed setter Tv through converter 16, AND gate 18 and OR gate 21, computer 14 derives an exposure value representative of an effective exposure aperture, for example, 5.6, which is then applied through the gated-on AND gate 23 and OR gate 26 to the second distributor 28. This computed result is also coded in the 5-bit binary form and stored, in this instance, in only two of registers $R_1$ through $R_3$, namely, registers $R_1$ and $R_2$. The data stored in the first and second groups of registers $R_1$ through $R_7$ are [2000 5.6] as shown in FIG. 1.

Figure 3:
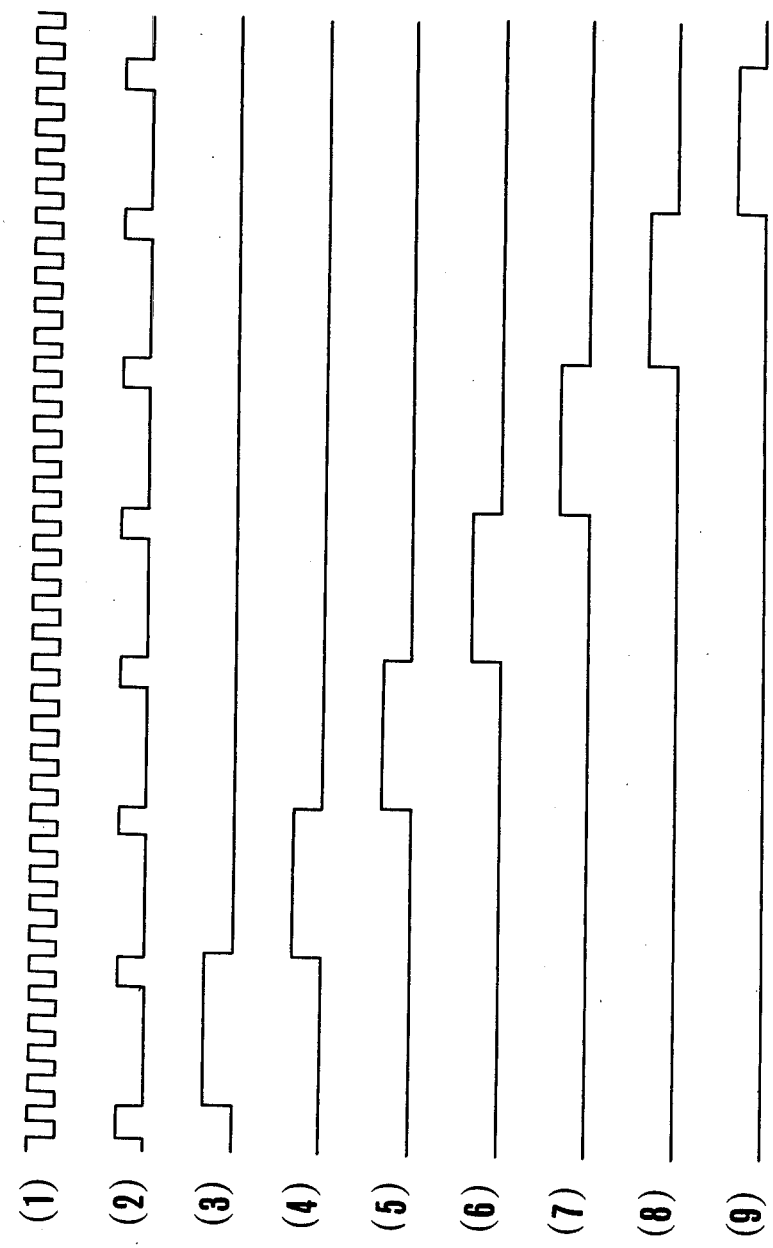
FIG. 3 is a pulse timing chart showing the manner in which the systems of FIG. 1 may be operated.

Line (1) in FIG. 3 illustrates the clock pulses from the clock pulse generator 31 which are applied to the digit timing pulse generator PC for producing a single output pulse for each five clock pulses on line (1) as shown at line (2). In synchronism with the tailing edges of seven successive pulses on line (1), the ring counter RC produces seven strobe pulses progressively from the first to seventh stages $TD_1$ to $TD_7$ as shown at respective lines (3) through (9). The strobe pulses on line (3) from the first stage $TD_1$ are applied to both of multiplexer MPX and switching network $SEL_1$. In the period of duration of each strobe pulse on line (3), the content of first register $R_1$ representative of (00110) is transfered through multiplexer MPX to decoder DEC in which it is converted to a signal capable, upon application to the segment driver SD, of causing the display of the corresponding decimal digit character by means of one of the seven-segment type display element $P_1$ through $P_7$. As noted above, in the case of the shutter preselection exposure control mode, the signals SS and $\overline{SS}$ are of the binary "1" and "0" conditions respectively, so that the AND gate $A_1$ is in the "on" state, while the AND gate $A_1'$ is in the "off" state. Therefore, the strobe pulses on line (3) from the stage $TD_1$ are applied through the AND gate $A_1$, OR gate $OR_1$ and digit driver $DD_1$ to the first display element $P_1$, thereby the decimal digit character corresponding to (00110) of register $R_1$, in this instance, "FIG. 6" is displayed at the first place or the rightmost display position. In the similar manner, the other decimal digit characters are displayed in positions progressively farther left as the strobe pulses on lines (4) through (9) are successively applied to both of multiplexer MPX and switching network $SEL_1$. The appearance of the display SG after each cycle of display element operations is [2000 5.6]. In other words, the least significant digit of the shutter speed as the preselected exposure control parameter is placed one place to the left of the most significant digit of the diaphragm aperture value as the computed result. In view of the display position of [2000] relative to that of [5.6], the photographer is informed that the exposure control mode in question is of the shutter preselection.

In the case of the diaphragm preselection automatic exposure control mode, a desired diaphragm aperture value, for example, 5.6, may be set in by operating the diaphragm setter Av. Next, the camera is set to the light metering position, and the mode select switch $\underline{30}$ is opened, thereby the diaphragm preference signal $\overline{SS}$ is applied to AND gates 17 and 22. As the AND gate 17 is gated on, the output of the diaphragm value setter Av after converted from analogue to digital form by converter 15 is applied to both of computer 14 and second distributor 27 through OR gate 21 and through OR gate 26 respectively. The preselected shutter diaphragm aperture value or 5.6 is taken into account as a word of successive two digit characters with a decimal point, namely, [5.] and [6], and is distributed to the registers $R_1$ and $R_2$.

Responsive to the digital signals supplied from adder 13 and diaphragm setter Av through converter 15, AND gate 17 and OR gate 21, computer 14 derives an exposure value representative of an effective exposure time, for example, 1/1000 second, which is applied through the gated-on AND gate 22 and OR gate 25 to the first distributor 27. This computed result is also stored in the registers $R_4$ through $R_7$. The date stored in the first and second groups of registers $R_1$ through $R_7$ are [1000 5.6].

Because of the opening of the mode select switch 30, the signals SS and $\overline{SS}$ are of the binary "0" and "1" conditions respectively, so that the AND gates $A_1$, $A_2$ and $A_4$ through $A_7$ are in the "off" state, while the AND gates $A_1'$, $A_2'$ and $A_4'$ through $A_7'$ are in "on" state. Therefore, the strobe pulses on line (3) from the stage $TD_1$ of the ring counter RC are applied through the AND gate $A_1'$, OR gate $OR_6$ and digit driver $DD_1$ to the sixth display element $P_6$. Next the strobe pulses on line (4) from the stage $TD_2$ are applied through the AND gate $A_2'$, OR gate $OR_7$ and digit driver $DD_1$ to the seventh display element $P_7$. Then the strobe pulses on line (6) from the stage $TD_4$ are applied through the AND gate $A_4'$, OR gate $OR_1$ and digit driver $DD_1$ to the first display element $P_1$. The other decimal digit characters of the computed exposure time are displayed in positions progressively farther left as the strobe pulses on lines (7), (8) and (9) are successively applied to both of multiplexer MPX and switching network $SEL_1$. The appearance of the display SG after each cycle of display element operations is [5.6 1000].

Figure 4:
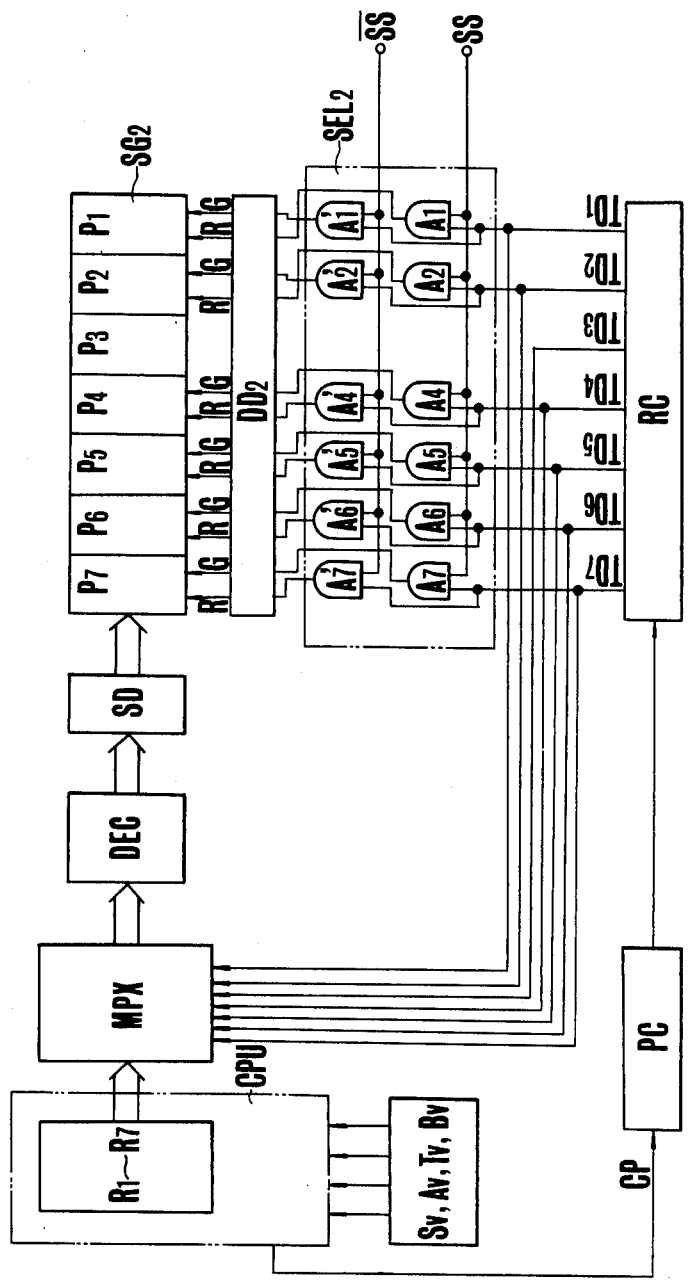
FIG. 4 is a block diagram of a second embodiment of the invention.

Referring to FIG. 4, there is shown the second embodiment of the present invention, wherein the same reference characters have been employed to denote parts which remain substantially unchanged from the first embodiment illustrated in FIG. 1. As noted above, the second embodiment of the present invention resides in displaying the digit characters of the preselected exposure control parameter value in a predetermined different color, in this instance, with green light, from that in which the digit characters of the computed result are displayed, in this instance, with red light. In this respect, the second embodiment employs a different type of 7-segment display element $SG_2$ and digit decoder $DD_2$ adapted for use therewith. Because of the constant display positions of the factor and result relative to each other regardless of which mode is rendered operative, the switching network $SEL_2$ is constructed in a simplified form from that of switching network $SEL_1$ of FIG. 1.

As an example of the display element usable in the second embodiment, mention may be made of a light-emitting diode constructed in a known manner such that a silicon-doped GaAs Layer capable, upon application of a DC voltage of 1.3 volts with a current of 40 mA, of producing a infra-red light of about 9600 A. wavelength and a $GaAsO_6PO_4$ layer capable, upon application of a DC voltage of 1.9 volts with a current of 20 mA, of producing red light are applied on a single metal frame, and a fluorescent $NaYF_4$: YbEv powder layer as a top coat is applied thereon to produce a green light when the infra-red light is produced. With this display element, it is possible to produce either the green light or the red light when the silicon-doped GaAs layer or the $GaAsO_6PO_4$ layer is energized through the digit decoder $DD_2$ as indicated by arrows G and R in FIG. 4 respectively.

The switching network $SEL_2$ comprises a first array of AND gates $A_1$, $A_2$ and $A_4$ through $A_7$ and a second array of AND gates $A_1'$, $A_2'$ and $A_4'$ through $A_7'$, the strobe pulse inputs of each array being connected to the respective output stages $TD_1$, $TD_2$ and $TD_4$ through $TD_7$ of a ring counter RC. The gating control inputs of the first array are arranged to be supplied with a shutter preference signal SS, while the gating control inputs of the second array are arranged to be supplied with a diaphragm preference signal $\overline{SS}$. The outputs of AND gates $A_1$ and $A_2$ of the first array and those of AND gates $A_4'$ through $A_7'$ of the second array are connected through respective red light digit driving components of $DD_2$ to the first and second display elements $P_1$ and $P_2$ and to the fourth to seventh display elements $P_4$ through $P_7$ respectively. The outputs of AND gates $A_1'$ and $A_2'$ of the second array and those of AND gates $A_4$ through $A_7$ of the first array are connected through green light digit driving components of $DD_2$ to the first and second display elements $P_1$ and $P_2$ and to the fourth to seventh display elements $P_4$ through $P_7$ respectively.

With this arrangement, when the shutter preselection automatic exposure control mode is rendered operative by closing the mode select switch 30 of FIG. 1, the shutter preference signal SS is applied to the first array of AND gates, thereby the fourth to seventh digit display positions adapted for the shutter speed are in green color, while the first and second digit display positions adapted or the diaphragm aperture are in red color. In the case of the diaphragm preselection automatic exposure control mode, the diaphragm preference signal $\overline{SS}$ is applied to the second array of AND gates, thereby the fourth to seventh digit display positions are in red color and the first and second positions are in the green color. Although the relative display positions of the shutter speed and diaphragm aperture values are not reversed by switching the camera between the two exposure control modes, the photographer is informed by the different display color arrangement that the mode in question is of the shutter or diaphragm preselection.

Figure 5:
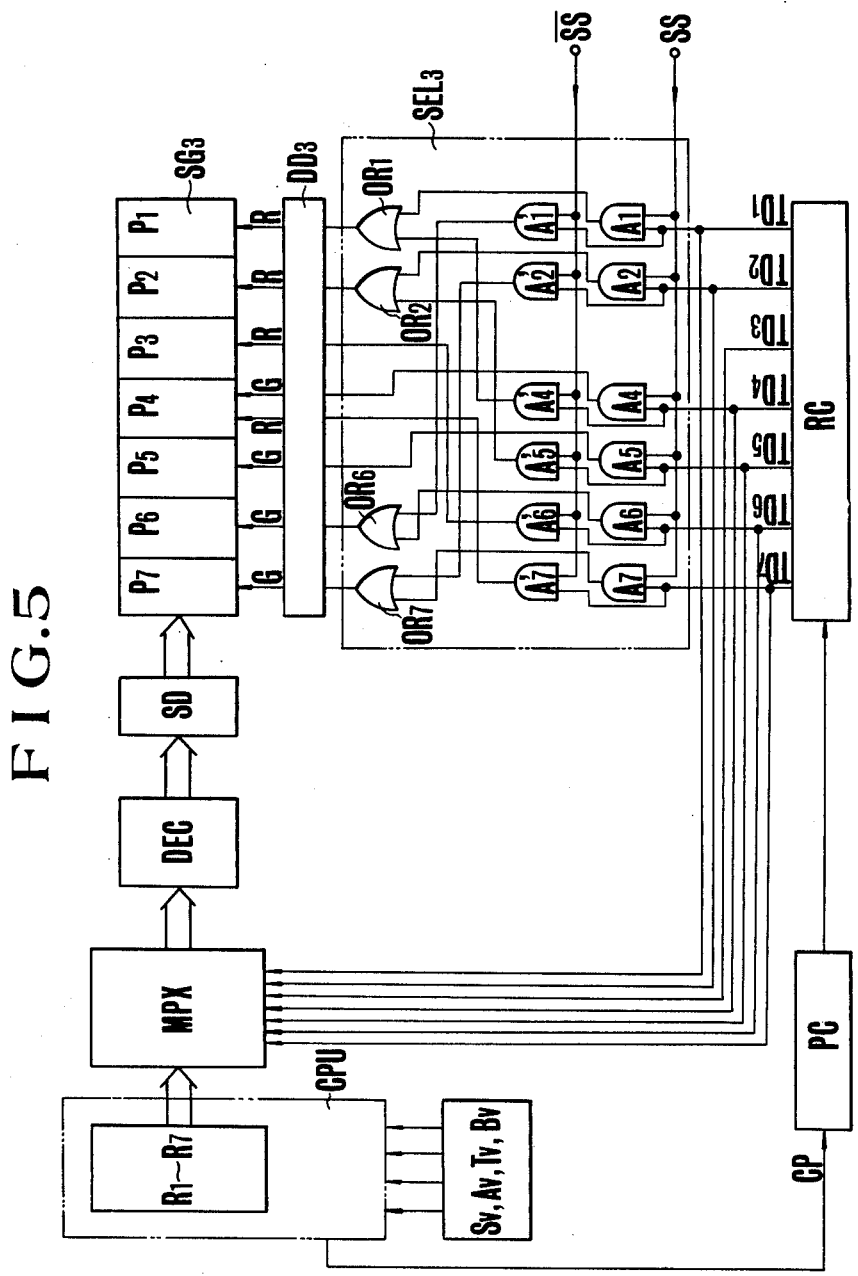
FIG. 5 is a block diagram of a third embodiment of the invention.

In FIG. 5, there is shown the third embodiment of the present invention, wherein the same reference characters have been employed to denote parts which remain substantially unchanged from the first embodiment of FIG. 1. In the third embodiment, the preselected exposure control parameter value is displayed at a constant location and in a constant color relative to those of the computed result, in this instance, the rightmost digit display position of the parameter value is lighted in green color and is located one place to the left of the most significant digit of the result, of which the all digit characters are displayed in red color. To achieve this, green light-emitting diodes are selected for employment in the fifth to seventh display elements $P_5$ through $P_7$, and red light-emitting diodes are for employment in the first to third display elements $P_1$ through $P_3$. Only one of the display elements, namely, the central fourth element $P_4$ is constructed to produce either a green or a red digit character when the shutter or diaphragm preselection control mode is rendered operative respectively. The switching network $SEL_3$ is shown as constructed by excluding one OR gate $OR_4$ from that $SEL_1$ of FIG. 1 and instead thereof by connecting the outputs of AND gates $A_4'$ and $A_7'$ to the green and red digit driver components of $DD_3$ as shown in FIG. 5.

In the operation of the display system of FIG. 5 switched to the shutter preselection automatic exposure control mode, the display elements $P_1$ through $P_7$ are driven for displaying the digit characters of the preselected shutter speed and computed diaphragm aperture value in positions progressively farther left as in a manner similar to that described in connection with FIG. 1 but in different colors, namely, the green color for the shutter speed, and the red color for the diaphragm aperture. It is to be noted that the fourth display element $P_4$ is caused to emit green light. In the case of the diaphragm preselection automatic exposure control mode, the fourth display element $P_4$ is caused to emit red light, so that the digit characters of the preselected diaphragm aperture value are displayed in green color at a location such that the least significant digit is placed one place to the left of the most significant digit of the computed shutter speed of which all the digit characters are displayed in red color.

Figure 6:
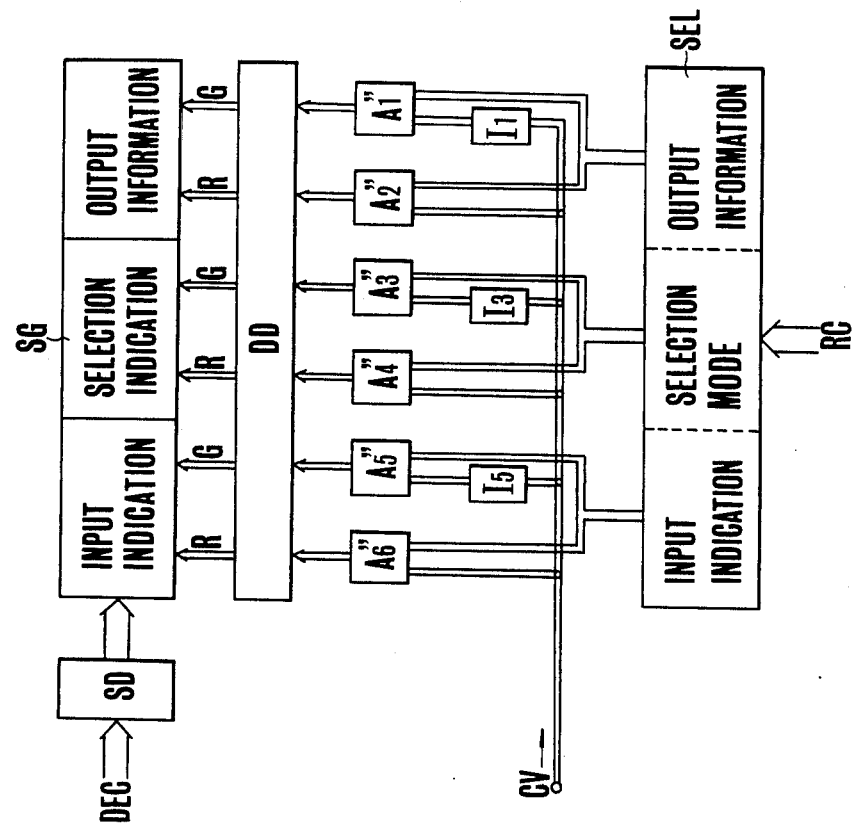
FIG. 6 is a block diagram of an outside-the-range warning circuit adapted for cooperation of the display system of FIG. 1.

The present invention has been described in connection with three particular embodiments, but the principles of the present invention are applicable to various types of display and particularly to the type having warning functions. For example, when the derived exposure value can not be realized with the associated exposure determining means, all of the digit characters of the parameter and result are displayed in a warning color or red color. This is schematically depicted in FIG. 6, wherein $A_1''$ and $A_2''$ corresponds to the first and second arrays of AND gates of FIG. 1, and $I_1$ denotes an inverter connected between a common terminal of the gating control inputs of the first AND gate array $A_1''$ and a control signal input CV. The outputs of the first and second AND gate arrays $A_1''$ and $A_2''$ are connected through green and red digit character producing components of a digit driver DD respectively, so that when all of the digit characters of the parameter and result are displayed in green or red color depending upon whether or not the computed result can be set in the exposure determining means respectively as the potential at the terminal CV is the binary "1" or "0" condition respectively.

As another example, when an exposure is made in flash mode with a shutter speed faster than the critical value for the associated flash unit, all the digit characters are displayed in red color. This is depicted in FIG. 6 as comprising first and second arrays $A_3''$ and $A_4''$ of AND gates corresponding to those of FIG. 1 and an inverter $I_3$.

As still another example, when the terminal CV is supplied wih a binary "0" or "1" signal when the film speed setter is set to ASA 100 position or to one of the color positions, all the digit characters are displayed in green or red color respectively. This is also depicted in FIG. 6, wherein first and second arrays $A_5''$ and $A_6''$ of AND gates and an inverter $I_5$ are connected in a manner similar to that described above.

Moreover, the system of FIG. 1 can be utilized in displaying what type of flash unit is associated with the camera, namely, so-called "speed light" or "flash bulb". In the case of "speed light", the preselected shutter speed is caused to be displayed at a certain distinct display position only when the shutter speed is correctly selected as being slower than the critical value. In the case of "flash bulb", the display is effected in a manner similar to that described in connection with FIG. 1.

Further, the terminal CV may be arranged to cooperate with the automatic sharp focus detecting device so that when sharp focus is effected, the display color is changed.

It will be seen from the foregoing description that the present invention provides a display system which can be selectively operated between opposed display position arrangements and/or between two different display colors depending upon whether or not the associated automatic exposure control system for a camera of the type or the camera performs its functions in the satisfactory conditions.

What is claimed is:

1. A display system adapted for use in conjunction with an automatic exposure control system of a camera of the type having a shutter preselection and a diaphragm preselection automatic exposure control modes comprising;

a. a first group of registers for storing the preselected exposure control parameter in binary coded decimal form,
b. a second group of registers for storing the computed result in binary coded decimal form,
c. timing pulse generating means,
d. a multiplexer connected to said first and said second groups of registers and receptive of the timing pulses from said timing pulse generating means for causing the data stored in said first and second groups of registers to be read out in sequence,
e. a decoder for converting the outputs of said multiplexer to corresponding coded signals for display,
f. digital readout means comprises of an array of display elements for displaying digit characters corresonding to the outputs of said decoder,
g. preference signal generating means having shutter preference signal generating means and diaphragm preference signal generating means, and
h. display control means cooperative with said timing pulse generating means for controlling the sequence of operation of said display elements in a selected program; said control means including means for selecting one of two programs in response to occurrence of the signal from said preference signal generating means, whereby the digit characters of the preselected exposure control parameter are displayed in constant positions relative to those in which the digit characters of the computed result are displayed regardless of which mode is rendered operative.

2. A display system according to claim 1, wherein said display elements are of 7-segment type.

3. A display system according to claim 1, said selecting means is provided with a first group of AND gates and a second group of AND gates, the number of AND gates in each of said first and second groups being equal to the number of pulses occurring at the output of said timing pulse generating means in one cycle of display element operations, the gating control inputs of said first AND gate group being connected to the output of said shutter preference signal generating means, and the gating control inputs of said second AND gate group being connected to the output of said diaphragm preference signal generating means.

* * * * *

UNITED STATES PATENT OFFICE
CERTIFICATE OF CORRECTION

Patent No. 4028712  Dated June 7, 1977

Inventor(s) Masaharu Kawamura et al

It is certified that error appears in the above-identified patent and that said Letters Patent are hereby corrected as shown below:

In the heading of the patent [73] should read as follows:

--[73] Assignee: Canon Kabushiki Kaisha
Tokyo, Japan--.

Signed and Sealed this

Sixth Day of December 1977

[SEAL]

Attest:

RUTH C. MASON  
Attesting Officer

LUTRELLE F. PARKER  
Acting Commissioner of Patents and Trademarks